April 14, 1925.

T. K. LOWRY

DUMP WAGON

Filed Feb. 10, 1921

T. K. LOWRY 1,533,436

DUMP WAGON

Filed Feb. 10, 1921   3 Sheets-Sheet 2

Inventor
Thomas K. Lowry
By Nissen & Crane
Attys.

April 14, 1925.
T. K. LOWRY
DUMP WAGON
Filed Feb. 10, 1921
1,533,436
3 Sheets-Sheet 3
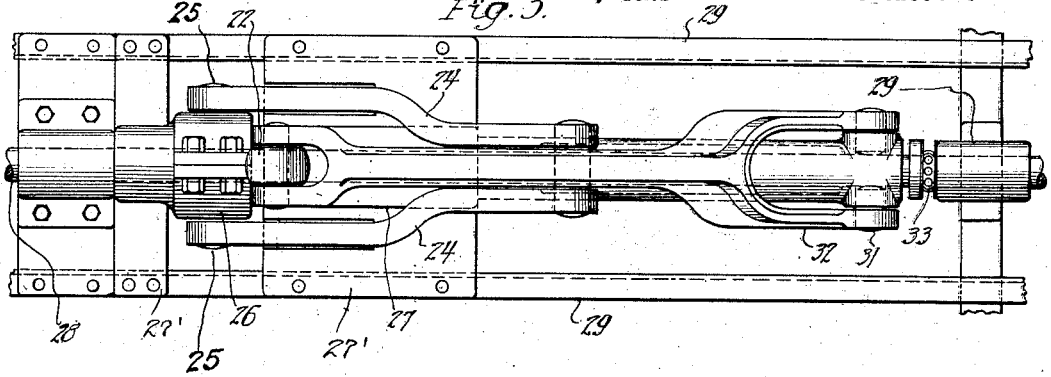
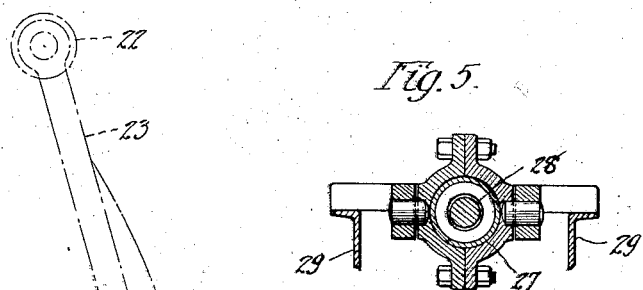
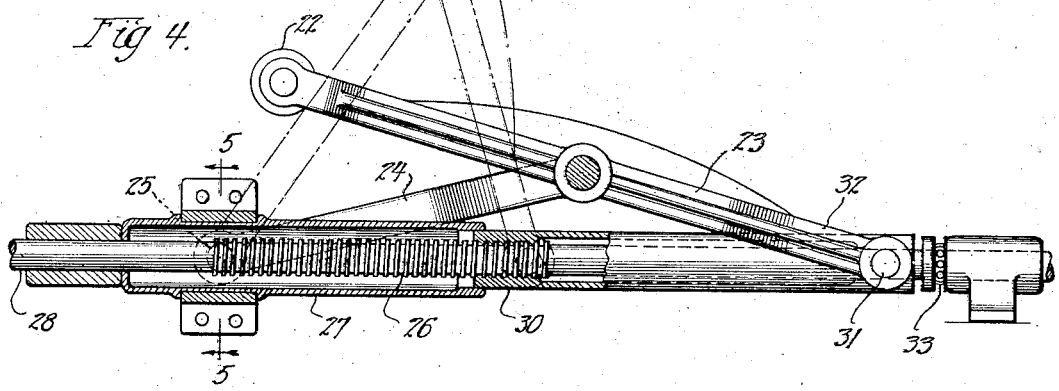

Patented Apr. 14, 1925.

1,533,436

UNITED STATES PATENT OFFICE.

THOMAS K. LOWRY, OF CHICAGO, ILLINOIS.

DUMP WAGON.

Application filed February 10, 1921. Serial No. 443,795.

*To all whom it may concern:*

Be it known that I, THOMAS K. LOWRY, a citizen of the United States, residing at Chicago, in the county of Cook and State of Illinois, have invented certain new and useful Improvements in Dump Wagons, of which the following is a specification.

My invention relates to dump wagons and trucks having dumping boxes.

One of the objects of my invention is the provision of a simple and efficient mounting for dumping boxes for wagons, trucks, and the like, with means for tilting said box about one of its longitudinal or rear lower edges to empty the same.

A further object is the provision of a simple and efficient lifting means operating on the central part of the bottom of a wagon box with means for holding one edge of the box down permitting dumping the box at the side held down.

A still further object is the provision of a simple and efficient device of the character mentioned which is strong, durable in use, and economical of manufacture.

Other objects will appear hereinafter.

An embodiment of my invention is illustrated in the accompanying drawings, forming a part of this specification, and in which—

Fig. 3 is an enlarged horizontal detail view of the lifting part of my improvement.

Fig. 4 is a central section of the same;

Fig. 5 is a section taken on line 5—5 of Fig. 4; and

Figure 1:
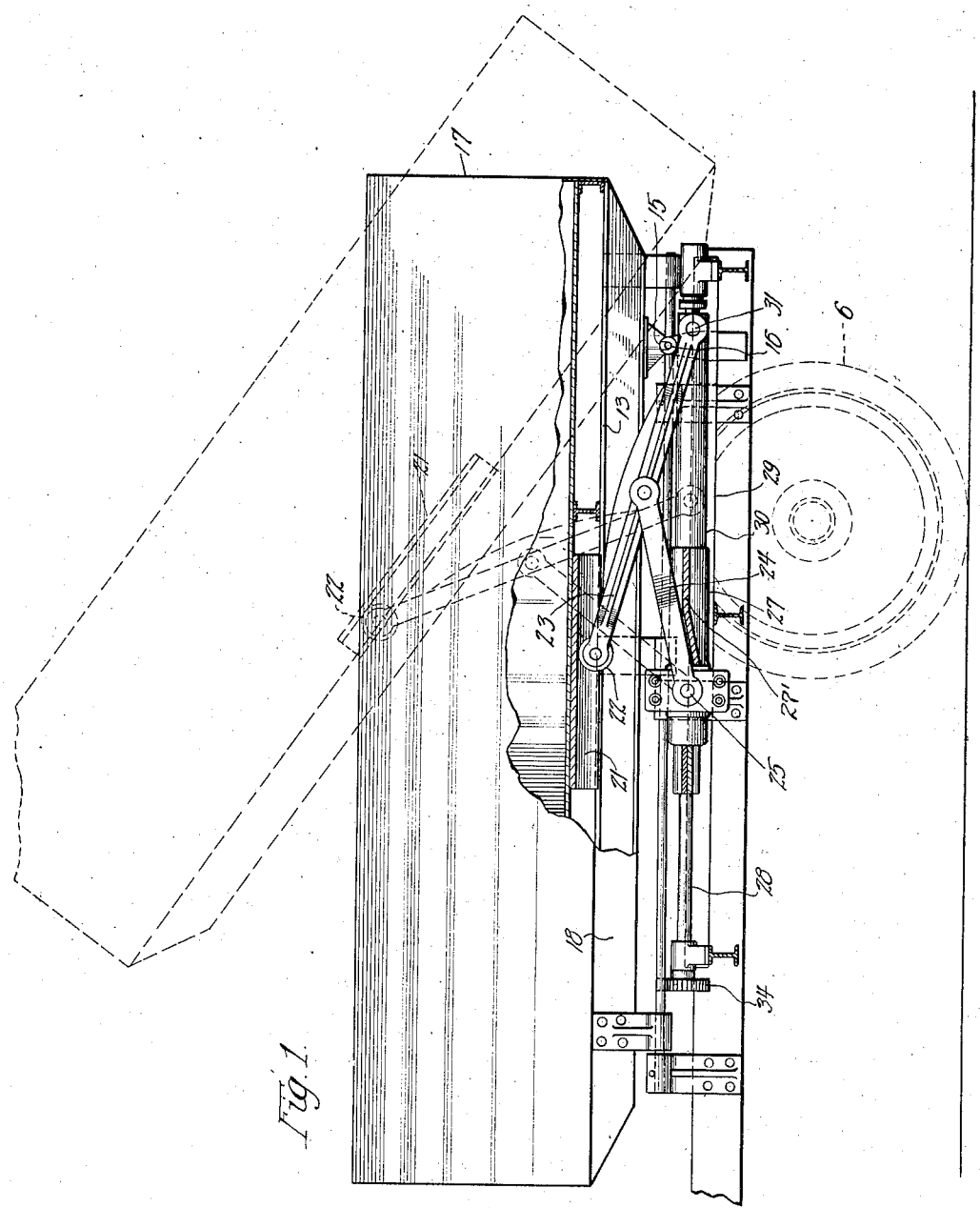
Fig. 1 is a fragmental side view of a truck embodying my invention and having portions broken away to expose underlying parts.

Referring more particularly to the drawings, I have indicated rear wheels 6 having an axle 7 and supporting springs 8, which may be of any approved construction. Mounted on the springs is a frame, which in the present instance is indicated as being made up of longitudinally extending channel bars 9 and transversely extending channel bars 10 secured together in any suitable manner.

Attached to the channel bars 9 are a plurality of upwardly and outwardly extending arms 11 which have notches 12 in their outer ends. There is a set of arms 11 on each channel bar 9, and in the end of each set of arms 11 is a pivot rod 13 extending longitudinally of the frame. Adjacent the rear end of the frame and back of the rearmost arms 11 are attached two arms 14 to the bars 9. These arms 14 have notches 15 in their upper ends, and in said notches is disposed a rod 16 extending transversely of the frame.

Above the frame is a box 17 having channel bars 18 extending longitudinally thereof, and depending from the bars 18 are arms 19 which engage the rods 13 and 16. In each of the arms 11 and 14, across the notches in said arms, is disposed a pin 20 so that the rods 13 and 16 can be locked in the arms on the frame and so that by removing the pins 20 engaging two of the said rods, the box may be tilted on a pivot about the other rod. It will be apparent that the pins 20 may be withdrawn from any two sides, leaving the pins in the other side so as to hold the last-mentioned side down to help tilt the box.

Figure 2:
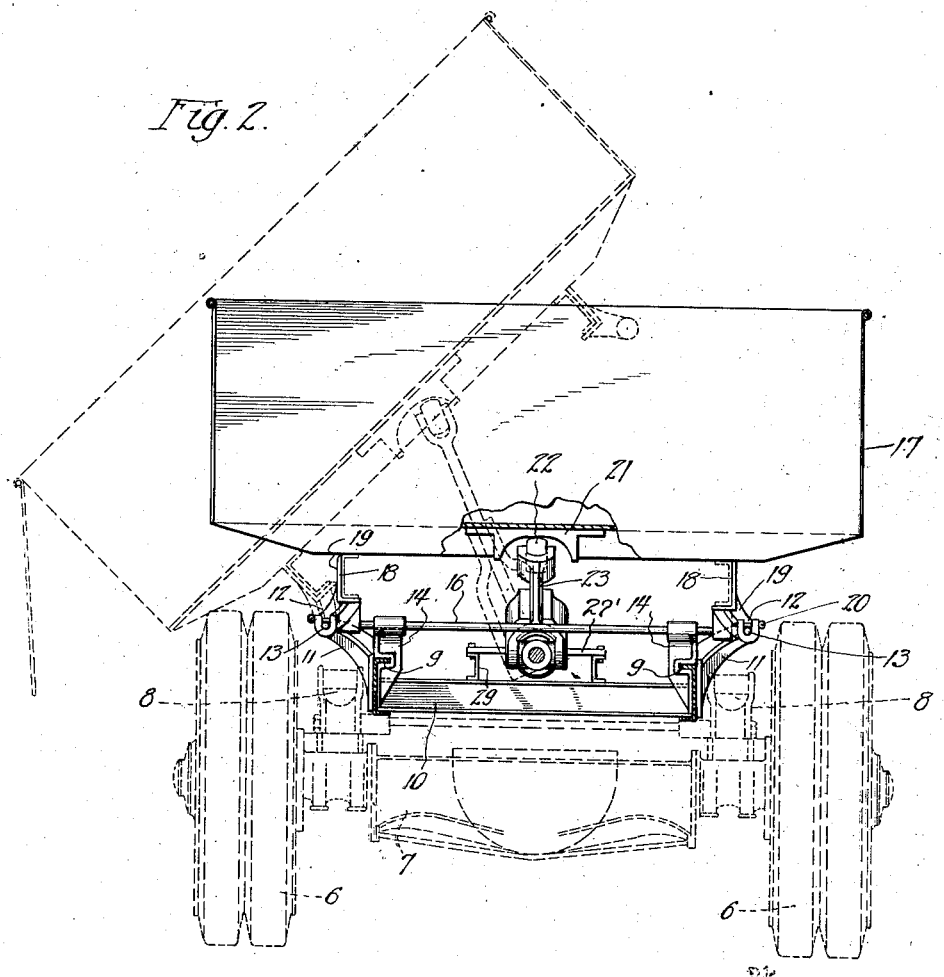
Fig. 2 is a rear view of the same showing portions broken away to expose underlying parts.
Figure 6:
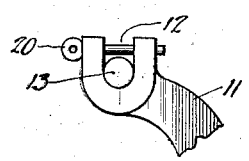
Fig. 6 is an enlarged detail view showing the connection between the frame and box.

On the under side of the box is a track 21 having a groove in cross section on the under side of the track. In the groove of track 21 is mounted a roller 22 which is pivoted between the bifurcated ends of a lever 23. The lever is pivoted between two links 24, and the latter pivoted as at 25 to a block 26, and the latter pivoted on a tube 27 which is mounted on a screw shaft 28. The tube 27 is supported directly from the subframe 29 by cross-plates 27' secured to the top of the subframe and connected with the tube 27, as shown in Figs. 1, 2 and 3. The screw shaft 28 is journaled in a subframe 29 on the cross bars 10 of the main frame. Also, journaled in the tube 27 is a tube 30 which is threaded on screw shaft 28 and pivoted as at 31 between the bifurcated ends 32 of lever 23. A thrust ball joint 33 may be attached to the screw shaft 28 when so desired to reduce friction when the lifting apparatus is in use.

In Fig. 1 I have indicated a gear 34 on screw shaft 28, and this gear may be connected to any suitable source of driving means, not shown. It may be attached to a suitable portion of the driving mechanism of the truck if so desired.

In use when the truck has been brought to the place where the box is to be dumped, the operator manually removes the pins 20 at two lower edges of the box, leaving the pins in the edge at which he desires to dump his load. Then upon applying power to screw shaft 28 the latter draws sleeve or tube 30 longitudinally of the frame and this movement rocks lever 23 about its pivotal connection with links 24, and this raises the end of said lever 23 having the roller 22 thereon. This roller moving in track 21 presses upwardly on the center of the box, tilting the latter about its lower edge, which is held by pins 20. The sides of the grooved track 21 limit the lateral movement of the lever during the raising operation to retain the roller 22 in position in the track. When the load has been discharged shaft 28 is revolved in the other direction to lower the box edge to its normal position on the frame. It will be apparent that the pins at any edge of the box may be retained and by the lifting apparatus operating on the center of the box the latter will be tilted about the edge held down.

I claim:—

1. A dump wagon comprising a supporting frame; a wagon box supported on said frame and having detachable connections along the bottom lower edges of said box; two connecting links pivoted about a common axis; a lever bifurcated at its ends and pivoted intermediate its ends between said links; a track circular in cross-section attached to the lower central portion of said box; a roller pivoted between the bifurcated portions of one end of said lever and engaging said track; a sleeve pivoted between the bifurcated portions at the other end of said lever; and a screw journaled in said frame and threaded in said sleeve.

2. Dumping mechanism comprising a platform; a container thereon; means for pivotally securing said container to either one of a plurality of sides of said platform while the remaining sides of said container are free to rise from said platform; and a power actuated hoist arranged to exert a lifting force centrally of said container to tilt said container about any one of its selective pivotal supports, said hoist being free to tilt with said platform in either one of two directions and to travel along said platform in a third direction.

3. Dumping mechanism comprising a carriage having a box thereon; means for pivotally securing said box selectively to the lateral and rear sides of said carriage; a power actuated hoist having traveling connection with the central portion of said box to exert a lifting force thereon and to travel along said box in a longitudinal direction relative thereto when lifting said box to dump from the rear thereof; and a pivotal support for said hoist on said carriage arranged to permit said hoist to tilt with said box toward either one of the longitudinal sides thereof.

4. A dump wagon comprising a supporting frame having a wagon box thereon, lever mechanism for raising said frame into dumping position, a screw for operating said lever mechanism, and a casing surrounding said screw and forming a closed chamber in which said screw operates at all times, said casing having telescoping portions one of which is movable along said screw and operatively connected with said lever mechanism.

5. A dump wagon comprising a supporting frame having a wagon box thereon, lever mechanism for raising said frame into dumping position, a screw for operating said lever mechanism, and a casing surrounding said screw and forming a closed chamber in which said screw operates at all times, said casing having telescoping portions one of which is movable along said screw and operatively connected with one portion of said lever mechanism while the other of which is held against longitudinal movement along said screw, both of said telescoping portions being rotatable to a limited extent about the axis of said screw.

6. A dump wagon comprising a supporting frame having a body thereon, toggle lever mechanism extending lengthwise of said wagon along the longitudinal center thereof, said mechanism being arranged to engage said body along the longitudinal center thereof for tilting said body laterally or rearwardly, a longitudinally centrally arranged screw for operating said toggle mechanism, and a telescoping casing for enclosing said screw to protect it from dirt and foreign material.

7. A dump wagon comprising a supporting frame having a wagon box thereon, lever mechanism for tilting said box comprising a pair of arms pivotally connected to one another, a support for one of said arms carried by said frame and free to swing laterally, but fixed against longitudinal movement relative to said frame, a screw passing through the axis of said support, and a member threaded on said screw and connected with the end of the other of said arms to raise said wagon box.

8. A dump wagon comprising a supporting frame, a wagon box mounted on said frame and arranged to tilt about either of the sides or the end, a screw shaft extending along the longitudinal center of said frame, journal bearings for supporting said shaft on said frame, a telescoping housing mounted on said screw shaft, toggle levers having the ends thereof pivotally mounted on said housing to permit said levers to swing laterally about the axis of said shaft, said levers being foldable into an approximately horizontal position beneath said wagon body, said toggle levers having an engagement with said wagon body along the longitudinal center thereof, and means for driving said screw shaft to operate the said toggle levers to raise said wagon body into any one of its three dumping positions.

9. A dump wagon comprising a supporting frame, a wagon body mounted on said frame and pivoted to tilt about either of the sides or the rear of said frame, a screw shaft extending horizontally of said frame and along the longitudinal center thereof, journal bearings for supporting said shaft on said frame, a telescoping housing surrounding said shaft, one member of said housing having threaded engagement with said shaft and movable therealong while the other member of said housing is held against longitudinal movement along said shaft, a lever arm having one end thereof pivotally mounted on said movable housing member, a sleeve surrounding said stationary housing member, a strut having one end pivotally mounted on said sleeve and having its opposite end pivotally connected with said lever arm, a roller on said lever arm, means for rotating said screw to operate said lever arm and strut and raise said roller, and a grooved track extending longitudinally of said wagon box and positioned centrally thereof for receiving said roller so that said wagon box may be raised to any one of its dumping positions by the operation of said lever arm and strut.

10. A dump wagon comprising a body and mechanism for raising said body into dumping position, said mechanism comprising a screw shaft, a casing for said screw shaft, means for supporting said casing independently of said screw shaft, and means for receiving a portion of the weight of said body and transmitting it to said casing.

11. A dump wagon comprising a body, lever mechanism for raising said body into dumping position, a screw shaft for operating said lever mechanism, a sleeve surrounding said screw shaft, means for supporting said sleeve independently of said screw shaft, and means for connecting said lever mechanism to said sleeve to sustain a portion of the weight of said body independently of said screw shaft.

12. A dump wagon comprising a support, a wagon body mounted on said support, a screw shaft journaled on said support, a sleeve surrounding said screw shaft, means on said support for carrying said sleeve, a collar journaled on said sleeve, and lever mechanism connected with said collar and operated by said screw shaft for raising said body.

13. A dump wagon comprising a chassis having a supporting frame thereon, a body mounted on said frame to tilt for dumping a load, a sleeve fixedly mounted on said frame, a screw shaft extending through said sleeve, a second sleeve telescoping with said first-mentioned sleeve and having threaded engagement with said screw shaft, a collar surrounding said first-mentioned sleeve, and lever mechanism pivotally connected with said collar for sustaining the weight of said body when raised into dumping position.

In testimony whereof I have signed my name to this specification on this 30th day of December, A. D. 1920.

THOMAS K. LOWRY.